(12) United States Patent
Ladewig

(10) Patent No.: US 10,043,257 B2
(45) Date of Patent: Aug. 7, 2018

(54) METHOD AND DEVICE FOR THE QUALITY EVALUATION OF A COMPONENT PRODUCED BY MEANS OF AN ADDITIVE MANUFACTURING METHOD

(71) Applicant: MTU Aero Engines AG, Munich (DE)

(72) Inventor: Alexander Ladewig, Bad Wiessee (DE)

(73) Assignee: MTU Aero Engines AG, Munich (DE)

( * ) Notice: Subject to any disclaimer, the term of this patent is extended or adjusted under 35 U.S.C. 154(b) by 55 days.

(21) Appl. No.: 15/064,652

(22) Filed: Mar. 9, 2016

(65) Prior Publication Data
US 2016/0275670 A1  Sep. 22, 2016

(30) Foreign Application Priority Data
Mar. 17, 2015 (DE) .................... 10 2015 204 800

(51) Int. Cl.
*G06T 7/00* (2017.01)
*G06K 9/20* (2006.01)
(Continued)

(52) U.S. Cl.
CPC .......... *G06T 7/0004* (2013.01); *G06K 9/2054* (2013.01); *G06K 9/4609* (2013.01);
(Continued)

(58) Field of Classification Search
CPC ......... G06T 7/0008; G06T 5/30; G06T 7/136; G06T 7/0004; G06K 9/6267; G06K 9/6202; G06K 9/4609; G06K 9/2054
See application file for complete search history.

(56) References Cited

U.S. PATENT DOCUMENTS 5,129,009 A * 7/1992 Lebeau ............... G01N 21/956
 348/87
7,200,259 B1 * 4/2007 Gold .................. G06K 9/0014
 382/149

(Continued)

FOREIGN PATENT DOCUMENTS

DE  102004017769 A1  12/2004
DE    10310385 B4    9/2006
(Continued)

OTHER PUBLICATIONS

Wurm, Martin et al., "Surveying the laser holes in fiber-reinforced graphite by means of optical coherence tomography," Jan. 2010 (Jan. 1, 2010), pp. 113-139, XP055294829.

*Primary Examiner* — Mia M Thomas
(74) *Attorney, Agent, or Firm* — Barlow, Josephs & Holmes, Ltd.

(57) ABSTRACT

A method for the quality evaluation of a component produced by an additive manufacturing method and device includes at least the following steps: providing image data that characterizes at least one component site of a component produced by an additive manufacturing method; converting the image data into a binary image; eroding the binary image into a structure image; determining contour data of the structure image; determining at least one image section of the image data that is delimited by the contour data; inspecting the at least one image section for the presence of an image region corresponding to a quality defect; and classifying the component as being qualitatively OK if no quality defect is present, or classifying the component as being qualitatively not OK if a quality defect is present.

8 Claims, 2 Drawing Sheets

Figure 1:
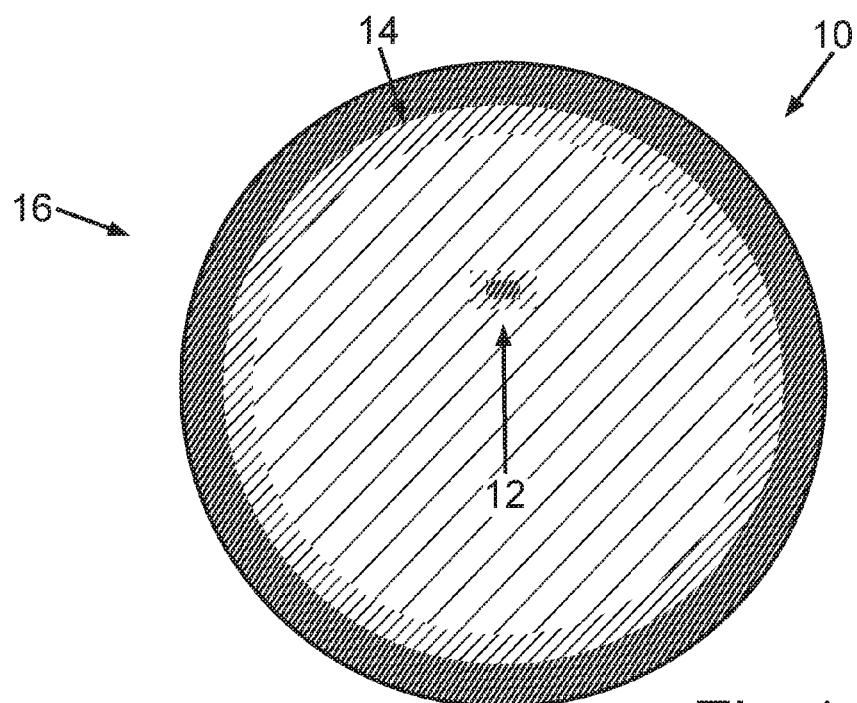

(51) Int. Cl.
  *G06K 9/46*  (2006.01)
  *G06K 9/62*  (2006.01)
  *G06T 5/30*  (2006.01)
  *G06T 7/136*  (2017.01)

(52) U.S. Cl.
  CPC ......... *G06K 9/6202* (2013.01); *G06K 9/6267*
    (2013.01); *G06T 5/30* (2013.01); *G06T 7/0008*
    (2013.01); *G06T 7/136* (2017.01); *G06T*
    *2207/10072* (2013.01); *G06T 2207/10101*
    (2013.01); *G06T 2207/20036* (2013.01); *G06T*
    *2207/30164* (2013.01)

(56) References Cited

U.S. PATENT DOCUMENTS

| | | | | |
|---|---|---|---|---|
| 8,480,754 | B2* | 7/2013 | Bojarski | A61F 2/389 606/79 |
| 9,846,929 | B2* | 12/2017 | Zou | G06T 7/0008 |
| 2002/0164063 | A1* | 11/2002 | Heckman | G01N 15/1475 382/133 |
| 2004/0133369 | A1* | 7/2004 | Pack | G03F 1/84 702/59 |
| 2006/0226865 | A1* | 10/2006 | Gallarda | G02F 1/1309 349/192 |
| 2008/0247632 | A1* | 10/2008 | Boehm | G03F 1/84 382/144 |
| 2008/0262659 | A1* | 10/2008 | Huskamp | G05D 23/1919 700/300 |
| 2011/0266265 | A1* | 11/2011 | Lang | A61F 2/30756 219/121.72 |
| 2012/0041446 | A1* | 2/2012 | Wong | A61B 17/1703 606/96 |
| 2013/0279750 | A1* | 10/2013 | Zhou | G06T 7/0002 382/103 |
| 2014/0204199 | A1* | 7/2014 | Yamada | G01N 25/72 348/86 |
| 2014/0228860 | A1* | 8/2014 | Steines | A61F 2/30942 606/130 |
| 2014/0327759 | A1* | 11/2014 | Tao | H04N 7/188 348/135 |
| 2015/0323318 | A1* | 11/2015 | Hess | B64F 5/60 348/47 |
| 2016/0012310 | A1* | 1/2016 | Kozicki | G06K 9/00577 382/218 |
| 2016/0054231 | A1* | 2/2016 | Hess | G01N 21/8806 702/82 |
| 2016/0098825 | A1* | 4/2016 | Dave | G06K 9/52 419/53 |
| 2016/0110858 | A1* | 4/2016 | Liu | G06T 7/41 382/149 |
| 2016/0141213 | A1* | 5/2016 | Bishop | H01L 24/19 438/16 |
| 2016/0297148 | A1* | 10/2016 | Ladewig | B23K 26/342 |
| 2016/0344948 | A1* | 11/2016 | Bamberg | G06T 7/0004 |
| 2017/0066084 | A1* | 3/2017 | Ladewig | G01N 25/72 |
| 2017/0136574 | A1* | 5/2017 | Zenzinger | B22F 3/1055 |
| 2017/0256466 | A1* | 9/2017 | Bishop | H01L 24/19 |

FOREIGN PATENT DOCUMENTS

| | | |
|---|---|---|
| DE | 202010010771 U1 | 1/2012 |
| DE | 102011009624 A1 | 8/2012 |
| DE | 102013201629 A1 | 7/2014 |
| DE | 102013214320 A1 | 1/2015 |
| DE | 202014009351 U1 | 1/2015 |
| EP | 1400922 A1 | 3/2004 |
| WO | 2007147221 A1 | 12/2007 |
| WO | 2014135141 A1 | 9/2014 |

* cited by examiner

METHOD AND DEVICE FOR THE QUALITY EVALUATION OF A COMPONENT PRODUCED BY MEANS OF AN ADDITIVE MANUFACTURING METHOD

BACKGROUND OF THE INVENTION

The invention relates to a method and a device for the quality evaluation of a component produced by means of an additive manufacturing method.

Additive manufacturing methods refer to processes in which material is deposited layer by layer on the basis of 3D design data in order to build up a component in an additive manner. Accordingly, additive or generative manufacturing methods differ from conventional material-removal or primary forming methods of fabrication. Instead of milling a workpiece from a solid block, for example, additive manufacturing methods build up components layer by layer from one or more materials. Examples of additive manufacturing methods are additive laser sintering or laser melting methods, which are used to produce components for aircraft engines, for example. Such a method is already known from DE 10 2004 017 769 B4, for example. In selective laser melting, thin layers of powder of the material or materials used are applied onto a construction platform and locally melted and solidified by using one or more laser beams. Afterward, the platform is lowered and another layer of powder is applied and again locally solidified. This cycle is repeated until the finished component is obtained. The finished component can subsequently be further processed as needed or can be used immediately. In selective laser sintering, the component is produced in a similar way by laser-assisted sintering of powder-form materials.

However, for the use of components that are produced by additive laser methods and can be subjected to high loads, a process approval is required, which, in turn, requires the monitoring of diverse process parameters, such as, for example, the laser power, the nature and condition of the material powder, and the like. In this case, the individual process parameters need to be monitored at intervals in the framework of a process monitoring by using a complex method of measurement that is adapted to the case at hand. A method for monitoring the layer build-up, which is known in and of itself, is optical tomography (OT), which, for each component layer produced, affords image data that enables conclusions to be drawn about the quality of the additive manufacturing process and thus of the component produced. It would be desirable in this case to employ, in particular, an automatic evaluation of process fluctuations, which, in general, are manifested by relatively smaller intensity values in the OT image data. The quantification of the brightness values can be established on the basis of the quantity of influencing parameters, but so far not on absolute values. Even a qualitatively optimal target process is subject to different influences, such as, for instance, the component geometry, the construction platform occupancy, the position within the component, etc. and accordingly can lead to image data having changing gray-value regions, which, however, nonetheless still characterize a qualitatively good component. In particular, when image regions whose brightness values lie below a certain tolerance band are evaluated, erroneous interpretations often ensue, because, for example, image sections having darker brightness values necessarily occur at component edges on account of the transition from component to powder and these image sections are erroneously interpreted as being quality defects. Similarly, in so-called max images, which to date have been employed for quality evaluation in most applications, darker regions are formed between the scanning frequencies and likewise are then wrongly evaluated as being inadmissible deviations.

SUMMARY OF THE INVENTION

The object of the present invention is to make possible a more reliable quality evaluation of additively manufactured components.

The object is achieved in accordance with the method and device of the present invention, wherein advantageous embodiments of the method are to be regarded as advantageous embodiments of the device, and vice versa.

A first aspect of the invention relates to a method for the quality evaluation of a component produced by an additive manufacturing method, said method enabling a more reliable quality evaluation in accordance with the invention in that at least the following steps are carried out: providing image data that characterize at least one component site of the component produced; converting the image data into a binary image; eroding the binary image into a structure image; determining contour data of the structure image; determining at least one image section of the image data that is delimited by the contour data; inspecting the at least one image section for the presence of an image region corresponding to a qualify defect; and classifying the component as being qualitatively OK if no quality defect is present, or else classifying the component as being qualitatively not OK if a quality defect is present. In other words, initially an imaging is made available in digital form as image data, wherein the imaging shows, for example, an additively produced component site of the component, such as, for example, a component layer. This image data is subsequently binarized, that is, converted to a binary image, the pixels of which can only assume the values "black" or "white." Each pixel can thus be stored with one bit. The coding of the pixels occurs fundamentally with the value 0 for black and 1 for white, although the opposite case can also be provided. This binary image is subsequently converted to a structure image by means of an erosion method. In this case, the erosion is carried out by using a structure mask. In this process, the structure mask has the dimensions of a partial quantity of the total binary image. The erosion comprises the pixel-by-pixel displacement of the structure mask over the binary image. In the process, it is checked whether the structure mask fully fits in the pixel quantity at the respective site of the binary image. If yes, the pixel of the binary image belongs to the eroded data quantity at the point at which the reference point of the structure mask is located. If no, the pixel does not belong to the eroded data quantity. In this way, it is possible to exclude certain component regions, in particular the transitions between the component and the adjacent powder, from the subsequent quality evaluation, as a result of which erroneous quality classifications can be reliably prevented. Depending on how large the transition between component and powder is, the component contour is accordingly formally reduced or narrowed. On the basis of the eroded structure image, the contour data thereof are subsequently determined. Accordingly, the contour data characterize the outer contour lines of a reduced component contour. The contour data can then be used to determine an image section of the original image data that is delimited by these contour data. In other words, the contour data define in a fully automatic manner at least one "region of interest" (ROI) in the original image data. Subsequently, the at least one image section is inspected for the presence of an image region corresponding to a quality defect. If no corresponding image region or quality defect is detected in the image section, then the component is classified as being qualitatively OK. If the opposite is true and an image region of the image section that corresponds to a quality defect is detected, then the component is classified as being qualitatively not OK. The method can be carried out basically in this process for one, a plurality of, or all of the component layers of the component. Similarly, it is fundamentally possible to use image data that characterize one plane through a plurality of component layers. Because the quality inspection is limited in accordance with the invention only to such image data that characterize image sections that are not subject to erroneous interpretation, the use of the method according to the invention enables a reliable and fully automatable quality evaluation of additively or generatively produced components and component layers.

In an advantageous embodiment of the invention, it is provided that an optical tomography device is used in order to determine the image data that are to be provided. Preferably, in this process, the optical tomography device functioning as a detection device affords gray-scale images of at least 16 bit depth. Subsequently, this makes possible a fast and precise binarization of the image data.

Further advantages ensue in that the image data are provided as a composite image and/or as a gray-scale image computed from a plurality of individual images. The use of a composite image, which, for example, can be obtained by the superimposition or addition of two or more separate images, can reliably prevent undesired dark image regions, which, for example, can arise between individual scanned regions, as well as other artifacts. Alternatively or additionally, the provision of a gray-scale image as image data offers the advantage that the subsequent erosion method for gray-scale images functions similarly to a minimum filter, so that dark structures are enlarged and brighter structures are reduced in size. As a result of this, edge regions of the component or of the observed component layer that are to be excluded from the evaluation are reliably blocked out and are accordingly not a part of the image section to be inspected.

Further advantages ensue in that the image data are converted to the binary image by using a threshold value method. As a result of this, imaging errors, such as dark noise and amplifier glow as well as so-called hot pixels and dark pixels, can be taken into account and, as needed, excluded from the subsequent quality evaluation.

In the process, it has been found to be advantageous when a threshold value that is used in the framework of the threshold value method is chosen in such a way that at least image noise arising from a dark current is eliminated. This is particularly of advantage when, for determination of the image data, a camera that uses a CMOS or CCD sensor is or was used, because these sensors generate a so-called electronic dark noise, which, among other things, depends on the exposure time, the temperature, the ISO settings used, etc. Therefore, in the case of image data that are present as a 16-bit gray-value image and accordingly contains only pixels having gray values between 0 and 65535, for example, a threshold value of 3000 can be chosen in order to take into account the dark field noise of the originally used camera system and to exclude it reliably from the following quality evaluation. Fundamentally, however, it is also possible, as needed, to use other threshold values.

In another advantageous embodiment of the invention, a square structure mask is used for eroding the binary image. A square structure mask in the context of the invention is understood to mean structuring elements with an area of $x*x$ pixels. In this case, x can be chosen as a function of the image data or the size of the transition between powder and component and can lie, for example, between 2 and 50. Preferably, x is an uneven number, so that the structure mask can have, for example, pixel dimensions of 3*3, 5*5, 7*7, 9*9, 11*11, 13*13, 15*15, 17*17, 19*19, 21*21, 23*23, 25*25, 27*27, 29*29, 31*31, 33*33, 35*35, etc.

In another advantageous embodiment of the invention, it is provided that, for the inspection of at least one image section for the presence of a quality defect, at least the following steps are carried out: a) providing a first data set, wherein the first data set comprises absolute limit values that each characterize a maximum admissible value range at an associated component site of the component to be produced in the image section; b) detecting a second data set by means of a detection device, wherein the second data set comprises actual values that correspond to the first data set and characterize the associated component site of the component to be produced in the image section; and c) comparing the first data set and the second data set by means of a computing device. In step c1), the component is then classified as being qualitatively fundamentally not OK if at least one actual value lies outside of its associated maximum admissible value range. Alternatively, in step c2), the component is classified as being qualitatively fundamentally OK if no actual value lies outside of its associated maximum admissible value range. If the component has been classified as being qualitatively fundamentally not OK, it can be concluded that there exists a serious disruption or malfunction. If the component has been classified as being fundamentally qualitatively OK, it can be assumed that the additive manufacturing process and the detecting device fundamentally are functioning. In this case, in a subsequent step d), a third data set is provided, which comprises mean values that are determined by means of the computing device from a plurality of actual values of the second data set, wherein this plurality of actual values characterize a contiguous component region composed of a plurality of component sites. This leads to a corresponding data reduction, because a plurality of measured actual values of a component region can be combined into a mean value. Subsequently, in step e), at least one best-fit function, which is dependent on the component geometry, is determined on the basis of the third data set by means of the computing device. In other words, in step e), a "best-fit function", that is, a smoothing function or approximating function, is determined through all mean values for the entire component. In this case, the type of best-fit function can fundamentally be any suitable mathematical description that reproduces as precisely as possible the plot of mean values through the component. In step f), threshold values, which are dependent on the component geometry, are then determined by means of the computing device, wherein the threshold values characterize an admissible scatter range of the actual values around target values specified by the best-fit function. In other words, in step f), threshold values are defined around this best-fit function and accordingly characterize a target process or target values. Accordingly, the threshold values correspond to dynamic limit values, which are dependent on the component region, and delimit an admissible scatter range of the individual component regions. In a following step g), it is checked by means of the computing device whether at least one actual value lies outside of the scattering range characterized by the threshold values. If no actual value lies outside of the scatter range, the component is classified in step g1) as being qualitatively OK. If at least one actual value lies outside of the scattering range, all actual values that lie outside of the scattering range are combined in step g2) in a fifth data set, after which the component quality is evaluated on the basis of the fifth data set and at least one predetermined quality criterion. In other words, it is initially checked whether one or more actual values lie outside of a scatter range characterizing a target process. If this is not the case, the component complies with the desired standard and is classified as being qualitatively OK or as being in the highest quality class. In the other case, all actual values deviating from the standard are isolated and stored in a fifth data set. In the further evaluation, only this fifth data set is then still regarded, as a result of which a further data reduction is afforded. The evaluation of the component quality on the basis of the fifth data set and at least one predetermined quality criterion can then lead to differing results. For example, the component can be further classified as being OK, but assigned to a lower quality class. Alternatively, however, the evaluation can also reveal that the deviations, individually or in sum total, depart so seriously from the target quality that the component is to be classified as being qualitatively not OK. As a result, a fully automated or at least largely automated and quantified quality evaluation and quality assurance of components that have been produced by an additive manufacturing method is made possible. It needs to be pointed out here that it is known to the person skilled in the art that the sequence of different method steps can also be fundamentally altered. For example, the steps a) and b) can be interchanged. Similarly, it needs to be pointed out that the method can be applied not only to complete components, but also to only partially produced components or to individual component layers.

Further advantages ensue in that at least one absolute limit value of the first data set is predetermined on the basis of an empirical value and/or on the basis of a measured value of a reference component having a flawless structure. In other words, the stipulation of the absolute limits occurs by way of empirical values and/or by way of test construction jobs or sections thereof that have shown that they have formed a flawless and compact structure.

In another advantageous embodiment of the invention, it is provided that the additive manufacturing method and/or the detection device are or is checked if the component in step c1) is classified as being fundamentally not OK. If, in step c1), it was found that the component is fundamentally not OK, because at least one actual value lies outside of the admissible range defined by the absolute values, then it may be assumed that there is a serious flaw in the manufacturing method and/or in the detection device. A check of the additive manufacturing method can comprise, for example, the inspection of the laser power, of the material used, or of other process parameters, such as, for example, the 3D data of the component. Alternatively or additionally, the correct functioning of the detection device is checked. In this way, it is possible to identify fundamental disruptions and to remedy them, as a result of which a high component quality and a lower reject can be ensured.

In another advantageous embodiment of the invention, the mean values of the third data set are determined as an arithmetic mean and/or as a mode and/or as a median and/or as a geometric mean and/or as a harmonic mean and/or as a quadratic mean and/or as a cubic mean. In this way, one obtains for each component region a data point that describes the position of the actual value in relation to the component region being observed. Depending on the component or component region being observed, the mean values can be determined by different computing procedures, as a result of which different contexts can be optimally taken into account in order to characterize the respective distribution of the actual values being observed.

Further advantages ensue when the mean values of the third data set are determined on the basis of actual values that characterize an exposed layer surface area of the component and/or a region of an exposed layer surface area of the component. In other words, the individual component layers formed during the additive manufacturing method or subregions thereof are used as the component region. In this way, mean values that characterize a component layer are obtained. This allows an especially simple and rapid quality evaluation of the entire component as well as of the individual component layers, so that, when deviations are determined in a given layer, a correspondingly rapid and simple adjustment of the additive manufacturing method is made possible.

Further advantages ensue when the actual values in the fifth data set are weighted, initially on the basis of at least one weighting factor, for evaluation of the component quality. This allows an improved quality evaluation, because more important or more reliable actual values accordingly have a greater influence on the quality evaluation than do less important or unreliable actual values.

In another advantageous embodiment of the invention, it is provided that, an indicator index and/or a number of indicators in the component and/or a distance from a neighboring indicator and/or a position in the component are or is used as weighting factor. As a result of this, an improved flaw weighting is made possible. The indicator index in this case basically describes a type of a specific process deviation that has a certain effect on the component. In accordance herewith, it has been shown to be advantageous when different indicator indices are used for different process deviations. The distance between neighboring indicators can be employed as a measure of the severity of an associated process deviation or of an associated flaw. Alternatively or additionally, the position of a process deviation or of a flaw within the component can be employed for evaluating the corresponding flaw. In this process, back regions of the component are usually to be evaluated more strongly than front regions.

In another embodiment of the invention, it has proven to be advantageous when a color value and/or a gray value and/or a size and/or a shape are or is used as the quality criterion. For example, various values from the image processing can be used for the formation of the indicator index in order to identify the kind or the type and the severity of the process deviation existing in each case.

Another aspect of the invention relates to a device for implementing a method for the quality evaluation of a component produced by means of an additive manufacturing method. In accordance with the invention, the device makes possible a more reliable quality evaluation of the additively produced components in that it comprises at least one detection device for determining and providing image data that characterize a component site of the produced component, and a computing device, which is coupled to the detection device for the exchange of image data and is designed in such a way as to convert the image data into a binary image, to erode the binary image into a structure image, to determine contour data of the structure image, to determine at least one image section of the image data that are delimited by the contour data, to inspect the at least one image section for the presence of an image region corresponding to a quality defect, and to classify the component as being qualitatively OK when no quality defect is present, or to classify the component as being qualitatively not OK when a quality defect is present. Further ensuing features and the advantages thereof may be taken from the descriptions of the first aspect of the invention, wherein advantageous embodiments of the first aspect of the invention are to be regarded as advantageous embodiments of the second aspect of the invention, and vice versa. In particular, the device according to the invention is designed so as to carry out a method according to the first aspect of the invention.

BRIEF DESCRIPTION OF THE DRAWING FIGURES

Figure 2:
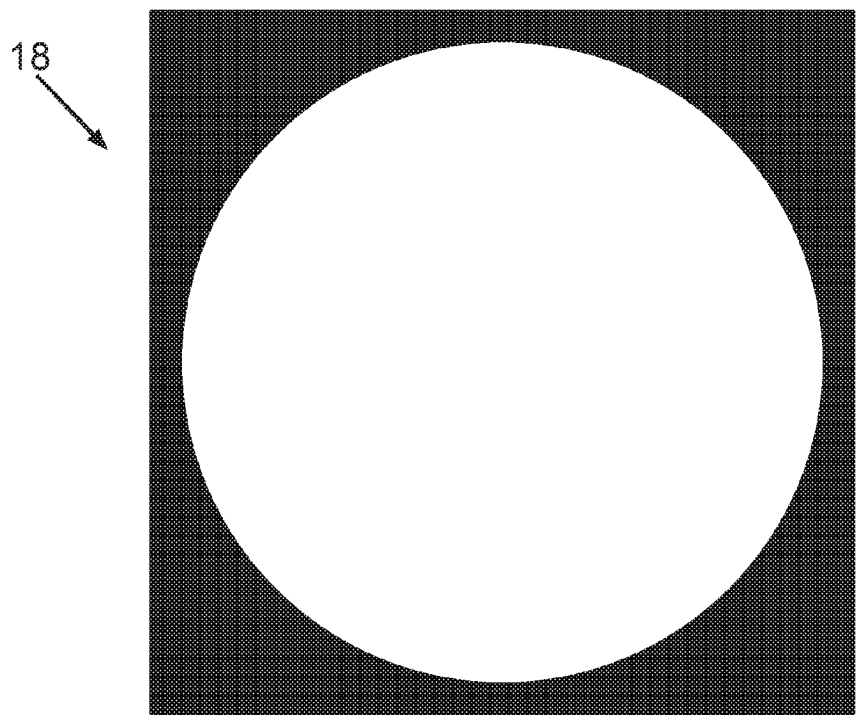
Figure 3:
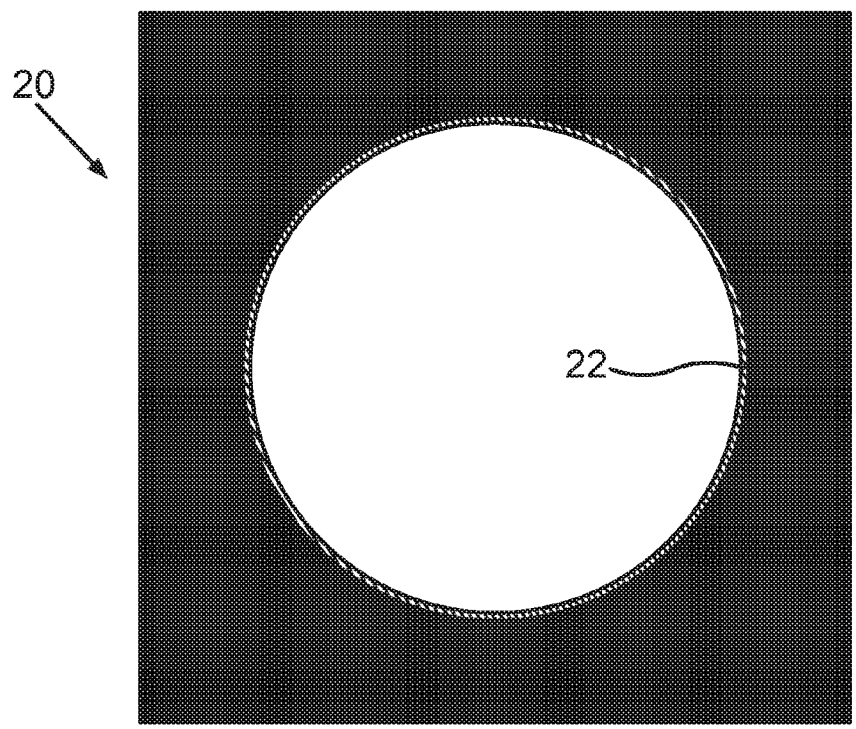
Figure 4:
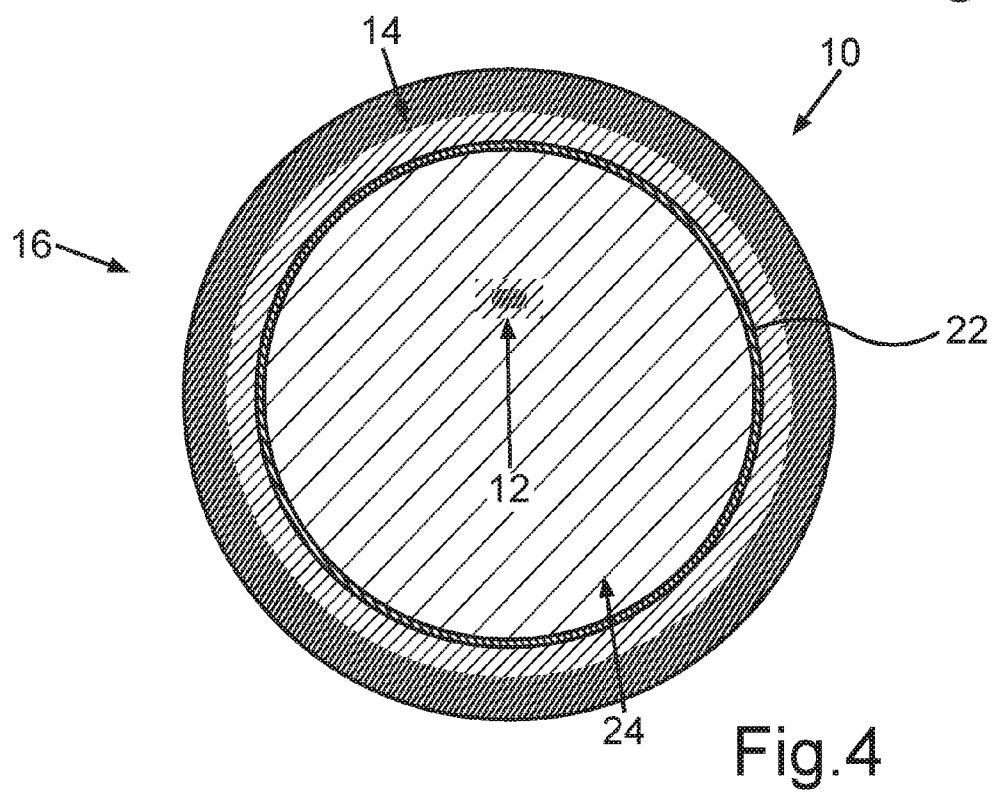

Further features of the invention ensue from the claims, the exemplary embodiment, as well as on the basis of the drawings. The features and combinations of features mentioned in the description as well as the features and combinations of features mentioned below in the exemplary embodiment can be used not only in the respectively given combinations, but also in other combinations, without departing from the scope of the invention. Accordingly, the invention also comprises and discloses embodiments that are not explicitly shown and discussed in the exemplary embodiments, but ensue and can be created through separate combinations of features from the discussed embodiments. Embodiments and combinations of features that, accordingly, do not have all of the features of an originally formulated independent claim are also to be regarded as being disclosed. Shown are:

FIG. 1 an imaging of an additively manufactured component layer having a process disruption;

FIG. 2 a binary image of the imaging shown in FIG. 1;

FIG. 3 a structural image that was generated by erosion of the binary image; and FIG. 4 the imaging shown in FIG. 1, with an image section determined on the basis of structure data, within which a subsequent quality evaluation is carried out.

DESCRIPTION OF THE INVENTION

In the framework of an additive manufacturing of a component by means of a laser sintering or laser melting method, for example, the component is formed iteratively in a way that is known in and of itself from a plurality of layers on the basis of predetermined 3D construction data. A 16 bit gray-scale image is recorded for each layer, wherein each pixel of the gray-scale image codes a brightness value (actual value) at a component site of the manufactured component.

FIG. 1 shows, by way of example, an imaging of an additively manufactured, round component layer 10 of the component, which has a process disruption 12 and hence a quality defect. In the exemplary embodiment shown, a composite image, which was obtained by addition of a plurality of individual images and exists in the form of digital image data, is used as imaging. The individual images were determined using an optical tomography device (OT). Through the use of the composite image, no dark regions that make the evaluation difficult occur between the scanned regions of the OT. Any superimposed regions in the composite images do not play a role in the evaluation of "colder" image regions.

It can be seen that the component layer 10 has an edge-positioned, annular transition region 14 to the adjacent powder layer 16 surrounding the component layer 10. The transition region 14 is characterized by relatively dark and non-uniform colors or brightness values, which could lead to an erroneous quality evaluation of the component layer 10.

For specific detection of darker regions in the imaging, the image data are therefore initially binarized, which means they are converted to a digital raster graphic, the pixels of which can only assume the two colors black and white or the values 0 and 1. The resulting binary image 18 is illustrated in FIG. 2. It can be seen that the white area of the binary image 18 essentially follows the outline of the component layer 10, so that all image regions that constitute the component layer 10 are symbolized in white and all image regions that constitute the surrounding powder layer 16 are symbolized in black. For binarization, a color or gray-scale threshold, for which it is known that it is reliably exceeded by the irradiated areas and which reliably excludes any dark-field noise of the camera system used, is used in this case. The threshold value used can be, for example, 3000 for 16 bit image data (0-65535 gray or brightness value). As needed, however, higher or lower threshold values or other binarization methods can also be used.

The binary image 18 is subsequently converted to a structure image 20, illustrated in FIG. 3, by using an erosion method. The shape and size of the erosion filter used in this case, which is also referred to as a structure mask, depend on the size of the transition between the powder layer 16 and the component layer 10. For example, a square erosion filter having 3×3, 5×5, or 7×7 pixels can be used. Similarly, a circular erosion filter can be provided. It can be seen in FIG. 3 that the resulting structure image 20 is also a two-color b/w image, in which, however, the white region is smaller compared to that of the binary image 18. In accordance herewith, originally darker image regions are formally enlarged by the erosion, whereas brighter image regions are formally reduced in size.

On the basis of the structure image 20, the contour data 22 thereof are determined; these data define, as an outer contour line of the size-reduced white region of the structure image 20, the component contour that is to be subsequently inspected. As can be seen in FIG. 4, these contour data 22 are extracted, stored, and superimposed on the original imaging shown in FIG. 1. It can be seen that the contour data 22 partition the transition region 14 that lies outside of the contour data 22 from an image section 24 that lies within the contour data 22. The subsequent quality evaluation of the component or of the component layer 10 is carried out exclusively within the image section 24, whereas the image regions lying outside, which include both the transition region 14 and the powder layer 16, are not taken into account. It can be seen that the process disruption 12 is characterized by a relatively darker image region. If such relatively dark image regions in the image section 24 are determined, the component layer 10 and hence the entire component can be classified as being qualitatively not OK. Depending of the number, kind, and area of the process disruption(s) 12, however, the component also can be classified as being qualitatively fundamentally OK, but as being assigned to a lower quality class.

The quality inspection of the individual component layers 10 occurs, as already mentioned, exclusively on the basis of the image sections 24 of the relevant imagings determined by binarization and erosion. All determined image sections 24 of the gray-scale images are combined into a second data set with actual values of the component. For each image section 24, the maximum gray value and the sum total of the gray values are then determined over all pixels of the image section 24. Subsequently, it is checked whether the determined actual values lie in part or in full outside of a maximum admissible value range, which is predetermined by a first data set containing absolute limit values for the component to be manufactured. The absolute limit values define a plausible range in which the target process should lie for each component. The absolute limit values are determined by way of empirical values or by way of test construction jobs and sections thereof that have shown that they have formed a flawless and compact structure. These absolute limit values serve primarily for reliably excluding a drastic change in the laser power or other effects, such as wrongly chosen construction parameters or the like. Coarse malfunctions of the OT system can also be detected in this way and, if need be, eliminated. Therefore, the actual values are compared to their corresponding absolute limit values. The absolute limit values are coded in the present example also as gray values, that is, as brightness values.

Subsequently, a fundamentally optional documentation can occur. For example, the determined layer images, the location and/or the number of determined absolute limit values exceeded for a given component layer, the number of cumulative flaws up to the present point in time, and the like can be stored in a database and/or displayed by means of a display device.

Depending on the test outcome of the image sections 24, a decision is then made as to whether the component or the currently inspected component layer 10 is fundamentally OK or fundamentally not OK. If a deviation from the absolute limit values is found, then evidently a serious process disruption 12 and/or a disruption of the OT system have or has occurred. In this case, the manufacturing method and/or the detection device need to be checked.

In the opposite case, that is, when the currently inspected component layer 10 is fundamentally OK, it is possible to exclude the existence of serious disruptions in the beam melt production unit or in the measurement system. In accordance herewith, at least the previously described inspection steps are repeated with the next component layer 10 in each case until the end of the additive manufacturing method.

In a further step, all actual values or image sections 24 are combined into a second data set and compared to a first data set in order to check whether inadmissible exceeding of the determined actual values from predetermined absolute values exists for the component layer 10. If the component layer 10 is free of flaws, the layer data of the component can be used for the definition of the first data set or for the definition of the target process. To this end, the mode and/or the arithmetic mean is(are) determined for each component layer 10. Furthermore, the mean value of all actual values is determined. Finally, the plot of the scatter as a function of component site is determined for the component.

For the quality evaluation, it is further checked whether the determined actual values of the second data set lie within the admissible absolute limits defined by the first data set. In an alternative step, it is also fundamentally possible to check whether the mean values of the component layers 10 each lie within corresponding absolute limit mean values. If a gross flaw, that is, an exceeding of the predetermined limit values exists, then the manufacturing method is initially discontinued in order to check the fundamental functioning of the additive manufacturing method and/or of the detection device (OT system).

If it is ascertained that the additive manufacturing method and the OT system are basically functioning, all gray values of the construction job determined after binarization and erosion are provided and the mean value or mode of all gray values is determined from each layer. In this way, one obtains one data point for each component layer 10. On the basis of this mean value, a best-fit function is determined, which is dependent on the component geometry and describes the plot of the gray values depending on the geometry. Different plots of the gray values can be made depending on the geometry of the constructed components. The type of best-fit function can therefore be a best-fit straight line in the simplest case, although all other suitable best-fit functions, such as, for example, polynomials of the nth degree or other mathematical descriptions that reproduce as exactly as possible the plot of the construction job are also conceivable.

The target process is characterized in detail by way of defined limits around this best-fit function. To this end, dynamic threshold values are determined, which are dependent on the component geometry and define a normal scatter range of the individual component layers 10 as a function of the component geometry.

Subsequent to this, all actual values are checked as to whether they lie inside of standard or target limits defined by the best-fit function and the threshold values. If yes, the component is classified as being qualitatively OK. Otherwise, all actual values that lie outside of the scatter range are combined into a fifth data set and evaluated once again more closely. This evaluation is carried out on the basis of a plurality of quality criteria and weighting factors.

Used as weighting factors for the indicators are initially an indicator index, the number of indicators in the component, and the distance to the closest indicator, as well as the position in the component. Starting from the indicator index, it is possible to provide various kinds of indicators. Starting from the distance to the next indicator, it is possible to employ the characteristic shape in the X/Y plane of the component layer 10 and/or the characteristic shape in the build-up direction Z of the component for quality evaluation. Starting from the position in the component, it is possible to check whether the deviation lies in the volume of the component and/or at the edge of the component and/or whether it completely passes through the component.

Employed as quality-relevant influencing factors, which can be displayed individually or in groups, furthermore, are the gray values (actual values) and/or the magnitudes of the actual values present in the fifth data set and/or the geometric shapes characterized by the fifth data set. Starting from the determined gray values, it is possible to display the following parameters individually or in any combination:

the maximum and minimum values;
the mean value of an indicator;
the plot or gradient; and/or
the scatter.

Furthermore, on the basis of the maximum and minimum values, it is possible in turn to display the corresponding absolute values and/or the relative position of the maximum and minimum values in relation to the mode or mean value. Correspondingly, starting from the mean value of an indicator, the corresponding absolute value and/or the relative position of the mean value and mode with respect to each other can be displayed.

Starting from the magnitudes of the actual values present in the fifth data set, it is possible to display the following parameters individually or in any combination:

characteristic shape in the X/Y plane; and
characteristic shape in the build-up direction Z.

On the basis of the mentioned characterization and quantification, a quality class of the component is then determined. Examples of possible quality classes are "reject," "in-spec part," "decision," or equivalent terms. The values and parameters employed for quantification of the quality classes can be established and checked on the basis of empirical values, such as material data, POD data (probability of detection—probability of detection of features/properties), NTD/DT reliability data (confidence/reliability of methods for material testing, ratio of "correct data" to "flaw alarms"), or the like.

The method described above can be carried out fundamentally in full or in part in a computer-based manner. The inspected component can be a component for an aircraft engine and/or for a turbomachine. The parameter values given in the documents for the definition of process and measurement conditions for characterizing specific properties of the subject of the invention are also to be viewed in the scope of deviations—for example, deviations due to measurement errors, system errors, DIN tolerances, and the like—as encompassed by the scope of the invention.

What is claimed is:

1. A method for the quality evaluation of a component manufactured by an additive manufacturing method, comprising:
providing a component that was produced by an additive manufacturing method; the component having at least one component site;
providing an optical imaging device;
capturing image data from the at least one component site by the optical imaging device; the image data characterizing the at least one component site of the component produced by an additive manufacturing method;
converting the image data into a binary image;
providing a structure mask having dimensions less than the binary image;
eroding the binary image into a structure image using the structure mask, wherein the erosion comprises a pixel-by-pixel displacement of the structure mask over the binary image and determining whether the structure mask fully fits at a respective site of the binary image, and including the eroded data of the binary image if the structure mask fully fits and excluding the eroded data of the binary image if the structure mask does not fully fit;
determining contour data of the structure image;
determining at least one image section of the image data that is delimited by the contour data;
inspecting the at least one image section for the presence of an image region corresponding to a quality defect; and
classifying the component as being qualitatively OK if no quality defect is present, or classifying the component as being qualitatively not OK if a quality defect is present.

2. The method according to claim 1, wherein the optical imaging device used to detect the image data to be provided is an optical tomography device.

3. The method according to claim 1, wherein the image data are provided as a composite image computed from a plurality of individual images and/or as a gray-scale image.

4. The method according to claim 1, wherein the image data are converted into the binary image by using a threshold value method.

5. The method according to claim 4, wherein a threshold value used in the framework of the threshold value method is chosen so that at least image noise arising from a dark current is eliminated.

6. The method according to claim 1, wherein a square structure mask is used for eroding the binary image.

7. The method according to claim 1, wherein, for the inspection of at least one image section for the presence of a quality defect, carrying out at least the following steps:

a) providing a first data set, wherein the first data set comprises absolute limit values that each characterize a maximum admissible value range at an associated component site of the component to be produced in the image section;
b) detecting a second data set by means of a detection device, wherein the second data set comprises actual values that correspond to the first data set and characterize the associated component site of the component to be produced in the image section;
c) comparing the first data set and the second data set by means of a computing device, and
  c1) classification of the component as being qualitatively fundamentally not OK if at least one actual value lies outside of its associated maximum admissible value range; or
  c2) classification of the component as being qualitatively fundamentally OK if no actual value lies outside of its associated maximum admissible value range; and
  if the component has been classified as being qualitatively fundamentally OK;
d) providing a third data set, which comprises mean values that are determined by means of the computing device from a plurality of actual values of the second data set, wherein this plurality of actual values characterizes a contiguous region composed of a plurality of component sites;
e) determining at least one best-fit function, which is dependent on the component geometry, on the basis of the third data set by means of the computing device;
f) determining threshold values, which are dependent on the component geometry, by means of the computing device, wherein the threshold values characterize an admissible scatter range of the actual values around target values specified by the best-fit function;
g) checking by means of the computing device whether at least one actual value lies outside of the scatter range characterized by the threshold values;
  g1) if no actual value lies outside of the scatter range, classification of the component as being qualitatively OK; or
  g2) if at least one actual value lies outside of the scatter range, combination of all actual values that lie outside of the scatter range in a fifth data set and evaluation of the component quality on the basis of the fifth data set and at least one predetermined quality criterion.

8. The method according to claim 1, further comprising the following steps for implementing a method for the quality evaluation of a component produced by means of an additive manufacturing method:
providing a detection device for determining and providing image data that characterize a component site of the produced component; and
providing a computing device, which is coupled to the detection device for the exchange of image data and is designed in such a way as to convert the image data into a binary image, to erode the binary image into a structure image, to determine contour data of the structure image, to determine at least one image section of the image data that are delimited by the contour data, to inspect the at least one image section for the presence of an image region corresponding to a quality defect, and to classify the component as being qualitatively OK if no quality defect is present, or to classify the component as being qualitatively not OK if a quality defect is present.

* * * * *